United States Patent
Hyodo et al.

(10) Patent No.: US 7,428,011 B1
(45) Date of Patent: Sep. 23, 2008

(54) WIDE DYNAMIC RANGE ELECTRONIC IMAGE RECORDING AND REPRODUCING SYSTEM

(75) Inventors: Manabu Hyodo, Asaka (JP); Yoshiya Ohara, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1266 days.

(21) Appl. No.: 09/654,263

(22) Filed: Sep. 1, 2000

(30) Foreign Application Priority Data

Sep. 2, 1999 (JP) .................. 11-248638
Sep. 2, 1999 (JP) .................. 11-248639

(51) Int. Cl.
H04N 5/76 (2006.01)

(52) U.S. Cl. .................. 348/231.6; 348/221.1; 348/254; 348/364; 348/671; 348/674; 382/167; 345/590

(58) Field of Classification Search .................. 348/254, 348/671, 674, 362, 231.3, 231.6, 130, 221.1, 348/363, 364, 365, 366; 382/162–167; 345/590
See application file for complete search history.

(56) References Cited

U.S. PATENT DOCUMENTS

| | | | | | |
|---|---|---|---|---|---|
| 3,971,065 | A | * | 7/1976 | Bayer | 348/276 |
| 5,047,861 | A | * | 9/1991 | Houchin et al. | 348/247 |
| 5,189,511 | A | * | 2/1993 | Parulski et al. | 358/518 |
| 5,309,243 | A | * | 5/1994 | Tsai | 348/221.1 |
| 5,337,167 | A | * | 8/1994 | Hiratsuka et al. | 358/533 |
| 5,455,621 | A | * | 10/1995 | Morimura | 348/229.1 |
| 5,528,293 | A | * | 6/1996 | Watanabe | 348/231.2 |
| 5,528,339 | A | * | 6/1996 | Buhr et al. | 355/32 |
| 5,621,476 | A | * | 4/1997 | Makita et al. | 348/620 |
| 5,631,705 | A | * | 5/1997 | Tani | 348/314 |
| 5,674,665 | A | * | 10/1997 | Sawyer et al. | 430/383 |
| 5,710,594 | A | * | 1/1998 | Kim | 348/254 |
| 5,909,244 | A | * | 6/1999 | Waxman et al. | 348/222.1 |
| 5,913,014 | A | * | 6/1999 | Gilman et al. | 358/1.9 |
| 5,929,908 | A | * | 7/1999 | Takahashi et al. | 348/364 |
| 5,991,456 | A | * | 11/1999 | Rahman et al. | 382/254 |
| 6,097,471 | A | * | 8/2000 | Buhr et al. | 355/38 |
| 6,160,532 | A | * | 12/2000 | Kaburagi et al. | 345/87 |

(Continued)

FOREIGN PATENT DOCUMENTS

JP 07288738 A 10/1995

(Continued)

OTHER PUBLICATIONS

"Digital Still Camera Image File Format Standard", Japan Electronic Industry Development Association, version 2.1, Jun. 12, 1998.*

Primary Examiner—Tuan V Ho
Assistant Examiner—Chriss S Yoder, III
(74) Attorney, Agent, or Firm—Birch, Stewart, Kolasch & Birch, LLP (57) ABSTRACT

The electronic camera has an imaging device that images a subject with subject reflectance R (%) with a dynamic range wider than that at displaying or printing to acquire image data and a recording device that converts the image data acquired by the imaging device with a predetermined function and records the converted image data and the information on the function as digital values (digit). Therefore, a printed image with an automatically or manually corrected density can be obtained at the displaying or the printing.

9 Claims, 8 Drawing Sheets

U.S. PATENT DOCUMENTS

| | | | | |
|---|---|---|---|---|
| 6,163,389 A | * | 12/2000 | Buhr et al. | 358/527 |
| 6,273,535 B1 | * | 8/2001 | Inoue et al. | 347/3 |
| 6,335,983 B1 | * | 1/2002 | McCarthy et al. | 382/162 |
| 6,512,858 B2 | * | 1/2003 | Lyon et al. | 382/305 |
| 6,522,830 B2 | * | 2/2003 | Yamagami | 386/95 |
| 6,597,468 B1 | * | 7/2003 | Inuiya | 358/1.15 |
| 6,650,365 B1 | * | 11/2003 | Sato | 348/231.3 |
| 6,650,437 B1 | * | 11/2003 | Nakajima | 358/1.9 |
| 6,738,092 B1 | * | 5/2004 | Nakagawa et al. | 348/231.3 |
| 6,762,791 B1 | * | 7/2004 | Schuetzle | 348/231.3 |
| 6,795,212 B1 | * | 9/2004 | Ichikawa | 358/1.9 |
| 6,801,248 B1 | * | 10/2004 | Horiuchi | 348/208.13 |
| 6,825,884 B1 | * | 11/2004 | Horiuchi | 348/362 |
| 6,829,301 B1 | * | 12/2004 | Tinker et al. | 375/240.12 |
| 6,845,176 B1 | * | 1/2005 | Sezan | 382/168 |
| 7,161,629 B2 | * | 1/2007 | Suzuki et al. | 348/362 |

FOREIGN PATENT DOCUMENTS

JP  11069179 A  3/1999

* cited by examiner

FIG. 8

WIDE DYNAMIC RANGE ELECTRONIC IMAGE RECORDING AND REPRODUCING SYSTEM

BACKGROUND OF THE INVENTION

1. Field of the Invention

The present invention generally relates to an electronic image recording and reproducing system, and more particularly to an electronic image recording and reproducing system including an electronic camera and an image reproducing apparatus such as an image monitor and a printer, in which image recording is performed with a dynamic range that is wider than that being required at reproducing (e.g., displaying or printing) of the image data, and exposure can be changed at the reproducing.

2. Description of Related Art

Japanese Patent Provisional Publication No. 7-288738 discloses an automatic exposure apparatus of an electronic camera that changes latitudes according to scenes at imaging. The automatic exposure apparatus performs knee control that prevents saturation at high-luminance parts in order to address a problem that the high-luminance parts are saturated since a luminance range is wide when a main subject is exposed at a normal exposure value with back light or too much front light.

The automatic exposure apparatus in Japanese Patent Provisional Publication No. 7-288738, however, can not perfectly match the exposure to any scenes since the automatic exposure apparatus only changes the luminance range by a knee processing. Saturation at highlight parts is prevented by the knee processing, but the highlight parts lose definition and the image lacks in contrast. Also, over-exposure of a main subject can not be corrected at printing.

Japanese Patent Provisional Publication No. 11-69179 discloses an image reproducing method in which image data of a range wider than the dynamic range of the image reproducing apparatus is obtained; a density range appropriate for a reproduced image is found as setup information; and when an image file stored in an image information recording medium with the image data is displayed, the user checks the displayed image according to the setup information with a special software and chooses one piece of the setup information to display the image.

According to the image reproducing method in Japanese Patent Provisional Publication No. 11-69179, an image capturing operation is inconveniently complicated, since it is required to predetermine the density range to be actually reproduced in the printing within the captured image information and to store the predetermined density range into the image file as a density range option. Moreover, the printing cannot always be performed with the optimum density, since the density information should be chosen in the reproducing from only the predetermined density range.

SUMMARY OF THE INVENTION

The present invention has been developed in view of the above-described circumstances, and has as its object the provision of an electronic camera in which imaging can be performed with a dynamic range that is wider than that required at displaying or printing of image data and a printed image with automatically or manually corrected density can be obtained at the displaying or the printing.

To achieve the above-described object, the present invention is directed to an electronic camera comprising: an imaging device which images a subject so as to acquire image data with an imaging luminance range wider than a reproducing luminance range on at least one of displaying and printing; and a recording device which converts the image data acquired by the imaging device with a predetermined function and records the converted image data and information on the predetermined function.

According to the present invention, the electronic camera has the imaging device that images the subject with the dynamic range wider than that at the displaying or the printing to acquire the image data and the recording device that converts the image data acquired by the imaging device with a predetermined function and records the converted image data and the information on the function. Therefore, the printed image with the automatically or manually corrected density can be obtained at the displaying or the printing.

To achieve the above-described object, the present invention is directed to an image reproducing apparatus which reproduces a visible image by at least one of displaying and printing according to first image data recorded with a recording luminance range wider than a reproducing luminance range on the at least one of displaying and printing, the image reproducing apparatus comprising: a reading device which reads the first image data with the recording luminance range and reads luminance range information relating at least the recording luminance range; a signal processing device which produces, from the first image data with the recording luminance range, second image data with a luminance range required on the reproducing according to the luminance range information; and a reproducing device comprising at least one of: a displaying device which displays the second image data as the visible image; and a printer which prints the second image data as the visible image.

To achieve the above-described object, the present invention is directed to an electronic image recording and reproducing system, comprising: an imaging device which images a subject so as to acquire imaged data with a recording luminance range wider than a reproducing luminance range on at least one of displaying and printing; a recording device which converts the imaged data acquired by the imaging device with a predetermined function into a first image data and records the first image data and luminance range information relating at least the predetermined function; a reading device which reads the first image data with the recording luminance range and reads the luminance range information; a signal processing device which produces, from the first image data with the recording luminance range, second image data with a luminance range required on the reproducing according to the luminance range information; and a reproducing device comprising at least one of: a displaying device which displays the second image data as the visible image; and a printer which prints the second image data as the visible image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder the preferred embodiment of the present invention is explained in detail according to the accompanying drawings.

Figure 1:
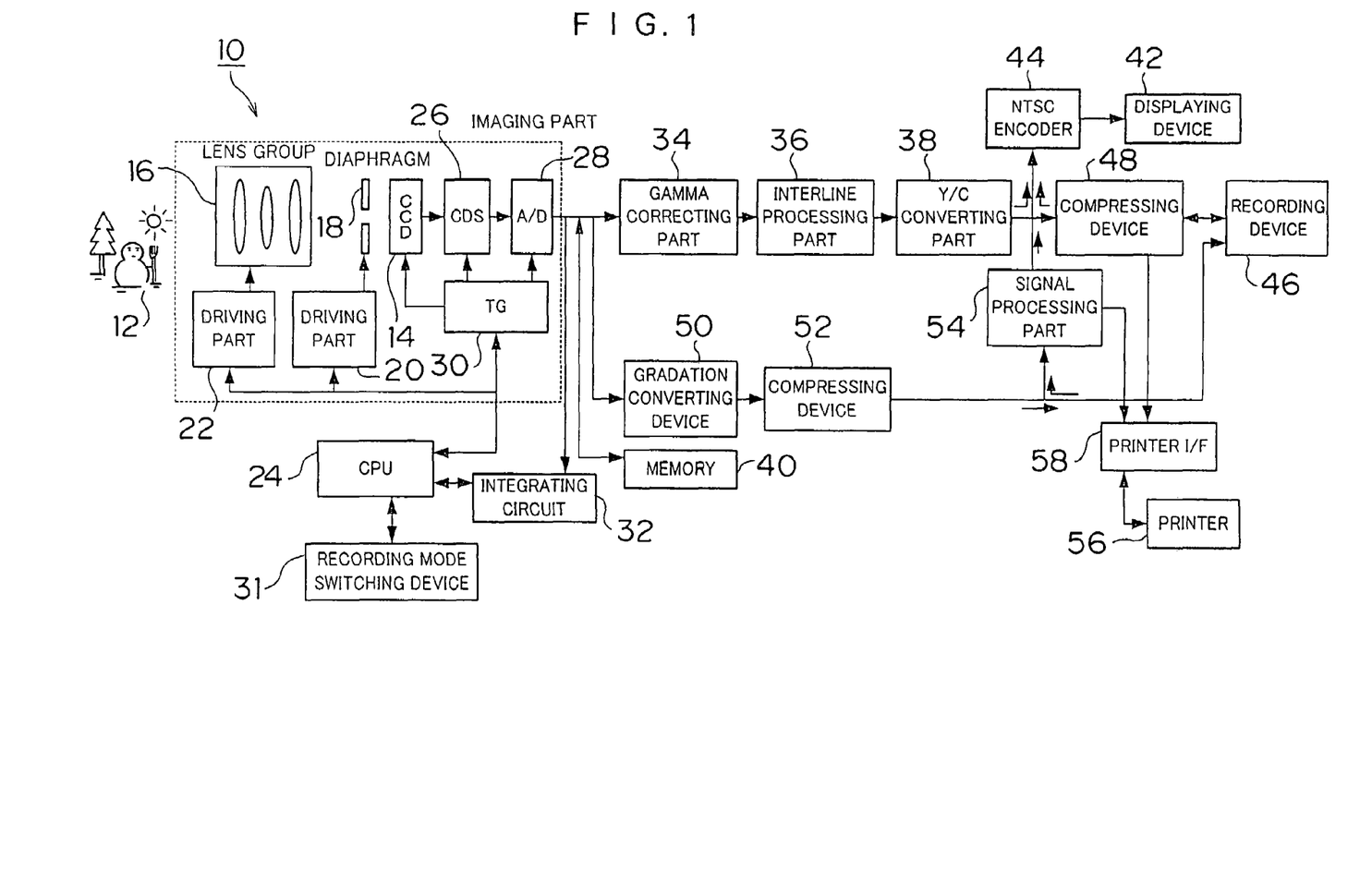
FIG. 1 is a block diagram showing the structure of a wide dynamic range electronic image recording and reproducing system according to an embodiment of the present invention.

FIG. 1 is a block diagram showing the structure of a wide dynamic range electronic image recording and reproducing system according to an embodiment of the present invention.

As shown in FIG. 1, an imaging part of an electronic camera 10 comprises a lens group 16 that forms an image of a subject 12 on a solid-state imaging device or a CCD 14, a diaphragm 18 that adjusts an amount of light reaching the CCD 14, a diaphragm driving part 20 that adjusts the aperture of the diaphragm 18, a lens driving part 22 that adjusts the position where the image of the subject is formed on the CCD 14, a CPU 24 that performs control of the whole electronic camera 10, for example, control of the lens driving part 22, control of the diaphragm driving part 20 and setting of imaging timing signals, the CCD 14, a CDS 26 that obtains R, G, B, G voltages corresponding to amounts of light by amplifying imaging signals and performing correlation double sampling of the imaging signals, an A/D converter 28 that converts analog image signals into digital signals, a timing generator 30 that transmits timing signals synchronizing the CCD 14, the CDS 26 and the A/D converter 28 and controlling a reduction rate, a frame rate and a pixel number of image data and a recording mode switching device 31 that switches between a normal recording mode and a wide dynamic range recording mode.

An integrating circuit 32 has a TTL AE function of abstracting luminance components from the obtained R, G, B, G digital signal values and finding a luminance level of the subject by, for example, integrating the digital signal values for a predetermined area and finding an exposure (an F-number and a shutter speed) and a contrast AF function of moving the lens group 16 so that, for example, high-frequency components of the image signals are maximum.

A signal processing part of the electronic camera 10 is provided with a memory 40 that temporarily stores the digitized R, G, B, G image data outputted in real time during the image signal processing at latter parts, a gamma correcting part 34 that performs gamma correction, optical black correction and white balance correction of the image data, an interline processing part 36 that produces R, G, B image data from the R, G, B, G image data and a YC converting part 38 that YC-converts the R, G, B image data into luminance information and color-difference signals.

When the image is to be displayed by a displaying device 42 in the NTSC format, an NTSC encoder 44 converts the YC-converted image data into video signals in the NTSC format.

When image data is to be recorded in a recording device 46, a compressing and expanding device 48 compresses the YC-converted image data and expands the compressed data at image data reading.

The electronic camera 10 further comprises a gradation converting device 50 that performs gradation conversion such as logarithmic conversion of the luminance of the image at a wide dynamic range recording, a compressing device 52 that compresses the gradation-converted image data and a signal processing part 54 that expands the compressed data or the image data read from the recording device 46 and performs gradation inverse-conversion to produce second image data and performs gamma correction and YC conversion to produce image to be displayed as need arises. The signal processing part 54 has a density adjusting device that can automatically or manually adjust density of a visible image.

A printer interface (I/F) 58 that controls a printer 56 and receives the obtained image data of the image to be printed from the compressing and expanding device 48 or the signal processing part 54 and transmits the image data to the printer 56.

Normal imaging of the electronic camera 10 constructed as described above that is different from wide dynamic range imaging will now be explained.

When the user operates the recording mode switching device 31 to choose the normal recording mode, a subject image formed on the CCD 14 through the lens group 16 is converted into electric charges by photoelectric transferring devices of the CCD 14. The accumulated electric charges are outputted from the CCD 14 according to an instruction of the timing generator 30 at fixed intervals.

The electric charges outputted from the CCD 14 are converted into the signals of R, G, B, and G filter arrangement that correspond to the light amounts by the CDS 26. The R, G, B, G analog signals are converted into the digital signals by the A/D converter 28 and are temporarily stored in the memory 40. After that, the digital signals are sequentially read out for the gamma correction, the optical black correction, the white balance correction, the interline processing and YC conversion, and then the image is displayed by the displaying device 42.

Then, the user turns the electronic camera 10 to the subject 12, and presses a shutter release button (not shown) to perform a shooting after determining the camera angle, the focus and the exposure with the manual or automatic with the AE function while looking at the image displayed by the displaying device 42.

The data of the image displayed by the displaying device 42 is recorded in the recording device 46 with a preset frame rate and pixel number for recording.

Gradation converting and image data recording in the wide dynamic range imaging will now be explained.

When the user operates the recording mode switching device 31 to choose the wide dynamic range recording mode and presses the shutter release button while looking at the image displayed by the displaying device 42, the R, G, B, G digital luminance signals outputted from the A/D converter 28 are temporarily stored in the memory 40. After that, the digital luminance signals are sequentially read out and transmitted to the gradation converting device 50. The gradation conversion is performed to produce first image data instead of the gamma correction, the interline processing and the YC conversion before the first image data is recorded in the recording device 46, so that a print of high quality can be acquired since a printer generally performs a printing according to R, G, B signals. The gradation converting processing of the gradation converting device 50 will now be explained with reference to FIGS. 2, 3 and 4.

Figure 2:
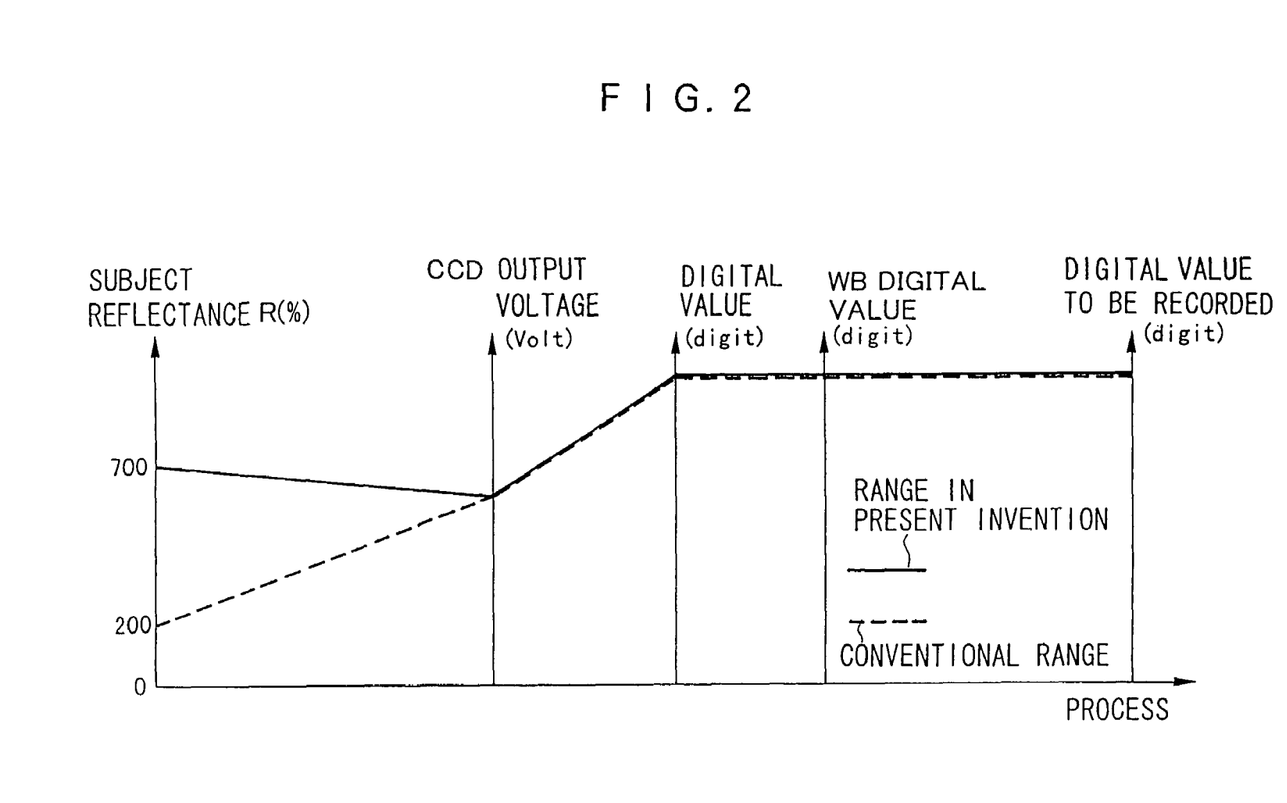
FIG. 2 is a graph diagram showing the relationship between subject reflectance R (%) and a digital value to be recorded D (digit)

FIG. 2 is a graph diagram showing the relationship between subject reflectance R (%) and a digital value of the first image data to be recorded D (digit).

As shown in FIG. 2, subject reflectance of 200% conventionally corresponds to a CCD output voltage corresponding to the maximum digital value. In case of recording method with a 12-bit gradation, the AE is adjusted so that the digital value corresponding to the light amount (luminance) with subject reflectance of 200% is 4095 (12 bit). However, if subject reflectances largely differ from each other on one image, for example, a subject with a half tone at a shooting is white or black on the reproducing (e.g., displaying and printing) and the half tone disappears since exposure values are often about 1.5 higher or lower than desired exposure values.

In the present invention, gains of the image data is changed so that subject reflectance of 700% corresponds to the CCD output voltage—corresponding to the maximum digital value to record the image data with a dynamic range that is much wider than that at the reproducing such as the displaying and the printing. In case of the recording method with the 12-bit gradation, the light amount with subject reflectance of 700% is 4095 (12 bit).

The dynamic range at the recording is two or more times as wide as the dynamic range at the reproducing such as the displaying and the printing, so that the luminance equivalent to the subject reflectance R (%) can be corrected at the reproducing. Since the exposure values are never higher or lower by 2.5 or more than desired exposure values and the dynamic range of the CCD is limited, the recording dynamic range does not have to be more than six times as wide as the reproducing dynamic range. Thus, the density of the visible image does not have to be adjusted within a range that is wider than a range of +2.5EV.

Figure 3:
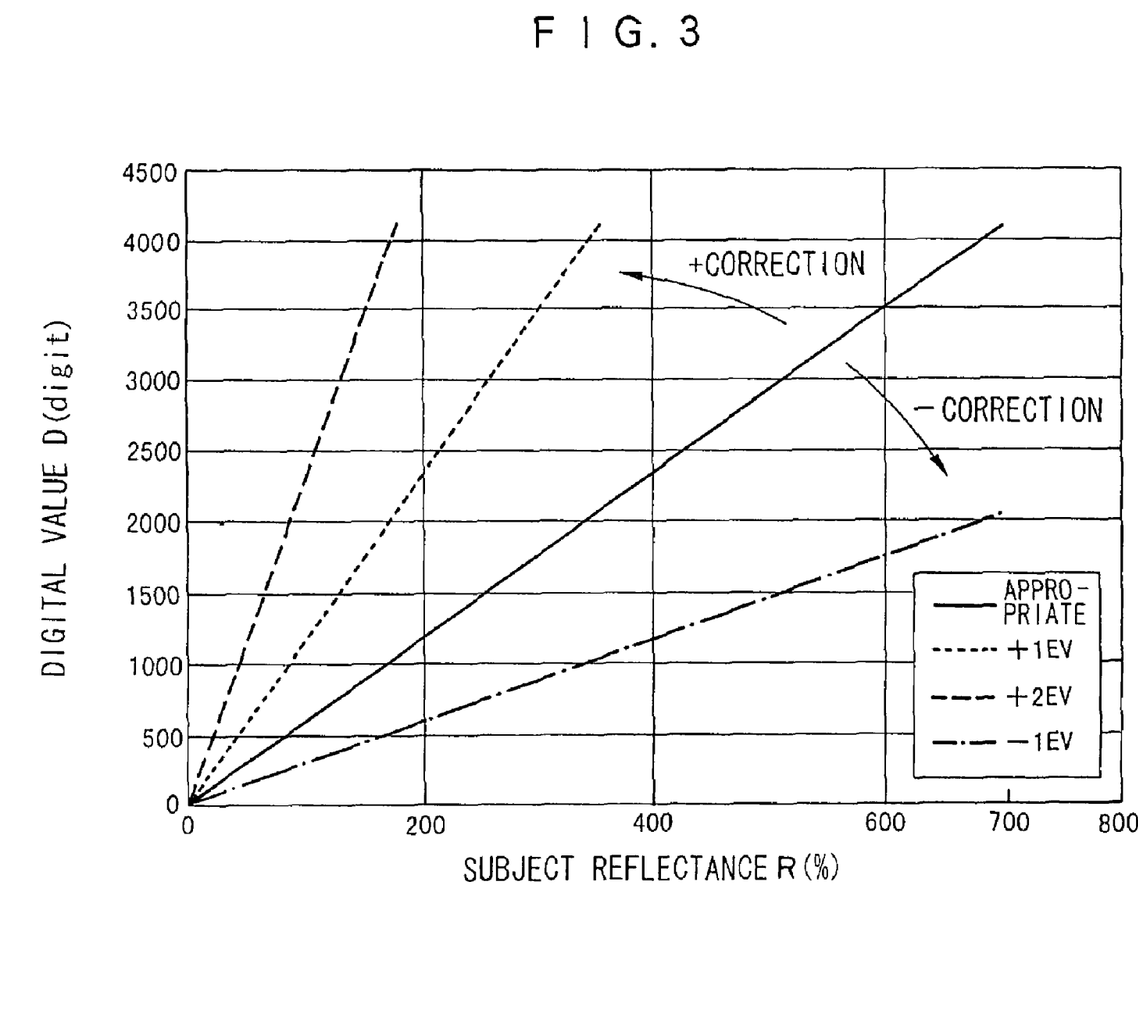
FIG. 3 is a graph diagram showing luminance correction in case the relationship between the subject reflectance R (%) and the digital value to be recorded D (digit) is shown by a linear function.

FIG. 3 is a graph diagram showing luminance correction in case the relationship between the subject reflectance R (%) and the digital value to be recorded D (digit) is shown by a linear function.

In FIG. 3, a straight line shows that the subject reflectance R within the range of 700% or lower can be recorded with the 12-bit gradation with normal exposure. If the reproduced image is 1EV darker than the desired subject image due to incorrect photometry of the AE, a gain (gradient of the straight line in FIG. 3) is changed at the displaying or the printing to positively correct the exposure by 1EV, so that the desired subject image can be obtained. Though only the subject reflectance R within the range of 350% or lower can be dealt with at the displaying, it does not matter at all for the following reasons.

A dynamic range at a printing is described in "Television Society Journal Vol. 47, No. 10, pp. 1395-1397 (1993) Japan" giving reversal film as an example. A photo CD described in the journal can deal with reflectance of 200% or lower, and the maximum reflectance of the dynamic range at the actual displaying or the printing is 200%.

There is no problem since the maximum subject reflectance R of 350% in case of the positive exposure correction by 1EV at the displaying or the printing is much higher than the maximum reflectance of 200% of the dynamic range at the printing. Even if the exposure is positively corrected by 2EV, the incorrect photometry of the AE can be completely compensated for at the displaying or the printing when the subject reflectance R within the range of 700% or lower is recorded since the subject reflectance R within the range of 175% or lower can be dealt with at the displaying. If the subject reflectance R is negatively corrected, the incorrect photometry of the AE can be completely compensated for since the dynamic range does not get narrower.

In the gradation conversion in which the relationship between the subject reflectance R (%) and the digital value to be recorded D (digit) is shown by the linear function, an operation for the gradation conversion is easy at the recording, displaying or the printing, and it does not affect the processing speed.

The gradation-converted image data as described above is compressed as need arises and recorded in the recording device 46.

By having both the conventional displaying method and the wide dynamic range recording, the electronic camera 10 can display the subject image on the displaying device at the shooting like the conventional electronic camera.

Figure 4:
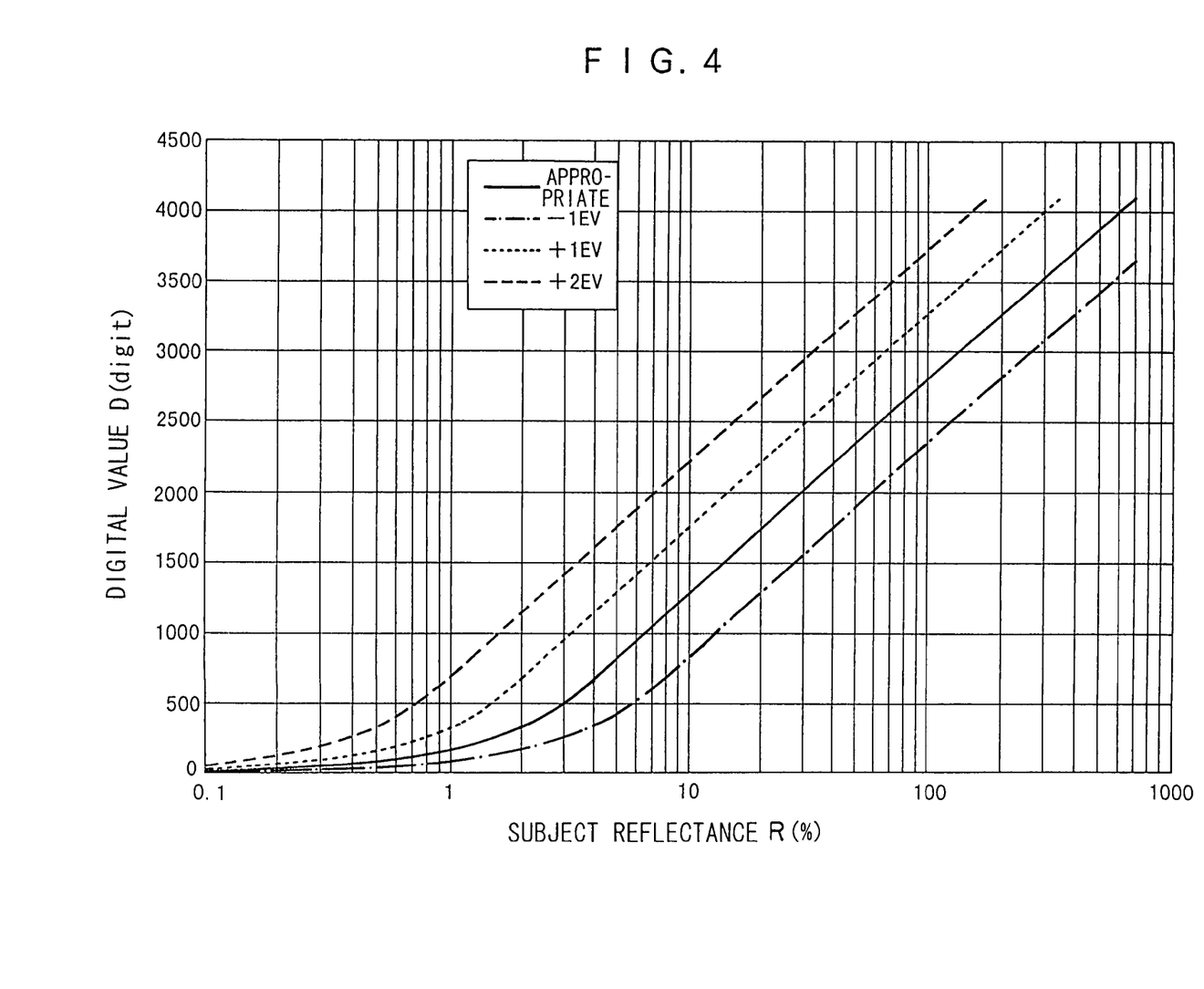
FIG. 4 is a graph diagram showing luminance correction in case the relationship between the subject reflectance R (%) and the digital value to be recorded D (digit) is shown by a logarithmic function.

FIG. 4 is a graph diagram showing luminance correction in case the relationship between the subject reflectance R (%) and the digital value to be recorded D (digit) is shown by a logarithmic function.

In FIG. 4, a line shows that the subject reflectance R within the range of 700% or lower can be logarithm-recorded with the 12-bit gradation with the normal exposure. Logarithmic recording conversion is shown by the following equations 1 and 2;

$$D0 = 1500 \times \log_{10} R - 172 \, (2.805 \leq R) \qquad \text{equation 1, and}$$

$$D0 = R \times 500/2.805 \, (2.805 \geq R) \qquad \text{equation 2,}$$

where D0 is a logarithm recording value (digit) at a shooting with the normal exposure and R is the subject reflectance (%). The bases of the logarithms are 10 in the equations, but the present invention is not limited to this.

In the logarithm recording, the subject reflection R is recorded with straight lines instead of being logarithm-converted when the digital value D is 500 or lower ($2.805 \geq R$) so that resolution when the reflection is low is kept high and the digital value D is 0 when the subject reflection R is 0.

The subject reflection R is logarithm-recorded as described above, and thus the resolution when the reflection is low can be kept high and the wide dynamic range recording can be performed. The operation for the gradation conversion in the electronic camera is more complicated than that in the recording method with the linear function, but the exposure correction is easy since the data only needs to be shifted (difference) when the exposure is corrected at the displaying or the printing.

Logarithmic recording conversion when the camera positively corrects the exposure by 1EV is shown by the following equations 3 and 4, and logarithmic recording conversion when the camera positively corrects the exposure by 2EV is shown by the following equations 5 and 6, and logarithmic recording conversion when the camera negatively corrects the exposure by 1EV is shown by the following equations 7 and 8;

$$D1 = 1500 \times \log_{10} R + 280 \, (1.401 \leq R) \qquad \text{equation 3,}$$

$$D1 = R \times 500/1.401 \, (1.401 \geq R) \qquad \text{equation 4,}$$

$$D2 = 1500 \times \log_{10} R + 732 \, (0.7 \leq R) \qquad \text{equation 5,}$$

$$D2 = R \times 500/0.7 \, (0.7 \leq R) \qquad \text{equation 6,}$$

$$D3 = 1500 \times \log_{10} R - 624 \quad (5.615 \leq R) \qquad \text{equation 7, and}$$

$$D3 = R \times 500/5.615 \quad (5.615 \geq R) \qquad \text{equation 8,}$$

where D1 is a logarithm recording value (digit) at the positive exposure correction by 1EV, and D2 is a logarithm recording value (digit) at the positive exposure correction by 2EV, and D3 is a logarithm recording value (digit) at the negative exposure correction by 1EV.

The gradation-converted first image data as described above is compressed as need arises and recorded in the recording device 46. The data of the recorded image file has conventionally a gradation different from that of the image at the shooting when it is read out and displayed or printed. To address this problem, a tag including luminance information showing the gradation of the image file has been converted is recorded with the image file, and the gradation is converted within a correction-possible range according to the tag at the displaying or the printing to produce the second image data.

Figure 5:
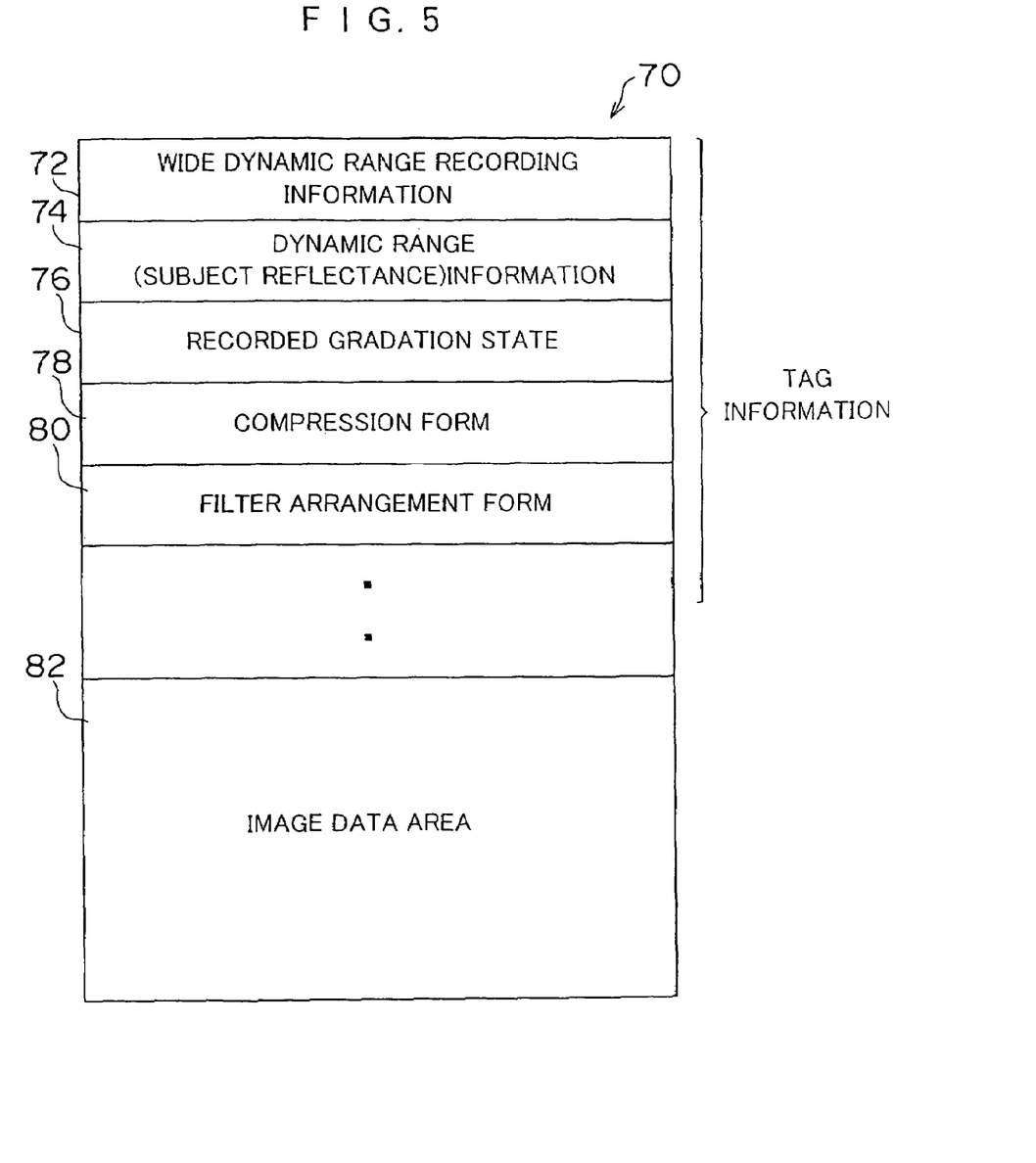
FIG. 5 is a diagram showing the structure of the image file including the luminance information on the gradation conversion according to the present invention.

FIG. 5 is a diagram showing the structure of the image file including the luminance information on the gradation conversion according to the present invention.

As shown in FIG. 5, the image file 70 comprises tag information of the image file and an image data area 82 in which the image data is recorded, and the tag information includes wide dynamic range recording information 72 showing whether the image data was recorded with the wide dynamic range, dynamic range information 74 showing maximum reflectance information that has been actually set in the camera, recorded gradation state 76 that is converting equations, first-order and zero-order constants and the format, compression form 78 that is information showing whether the image data has been compressed and the from of the compression, filter arrangement form 80 that is information showing the filter structure for separating the output from the CCD 14 into R, G and B signals, and so on.

The tag information in the gradation recording method is recorded in the header part of the image file 70 as described above, and thus the image at the shooting can be faithfully reproduced.

Figure 6:
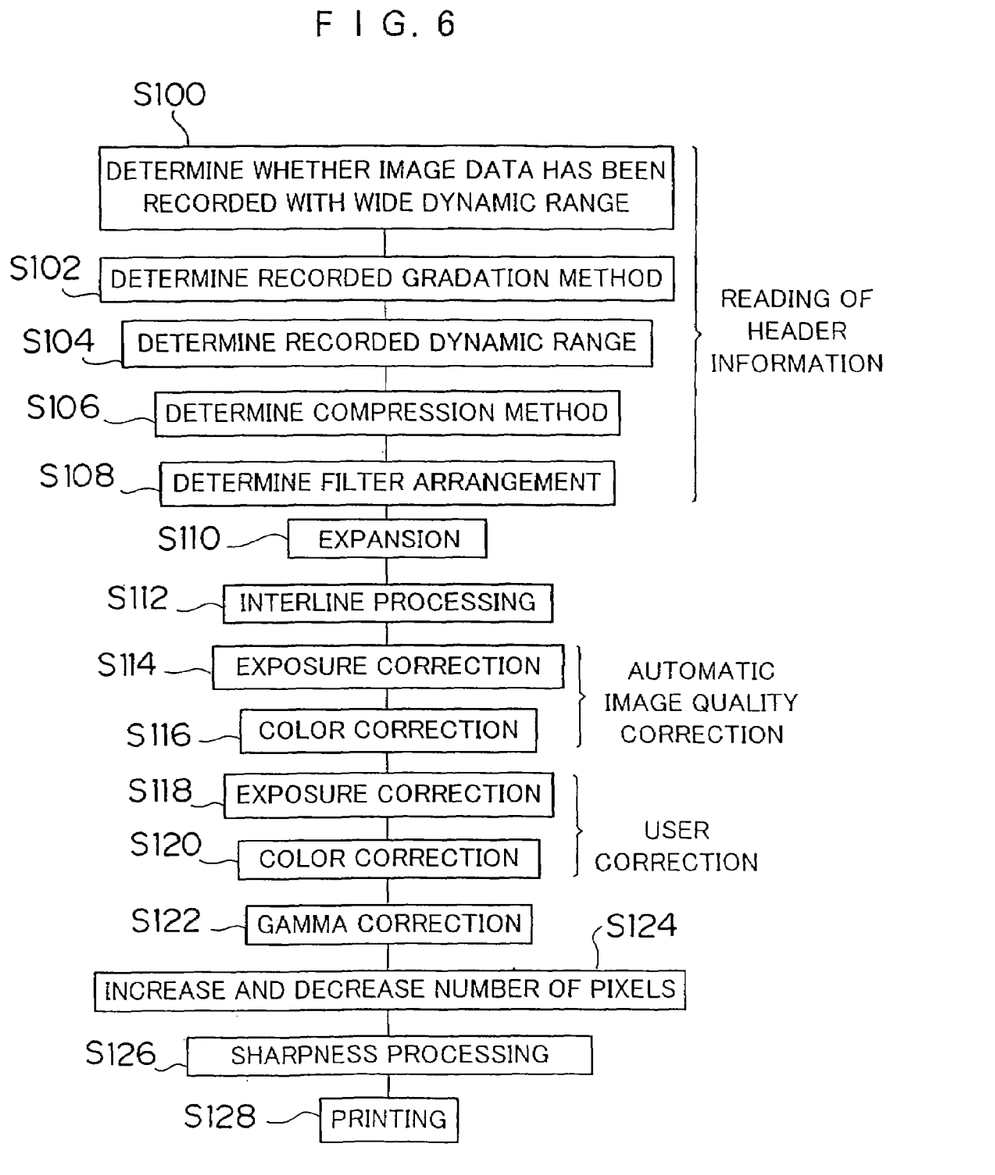
FIG. 6 is a flowchart showing a procedure for reading out the image file recorded in a recording device and printing the image.

FIG. 6 is a flowchart showing a procedure for reading out the image file recorded in the recording device 46 and printing the image.

After the image file 70 to be printed is read out of the recording device 46 and the processing for converting the image data in the image file 70 into the print image is started, the processing program goes to S100 of "DETERMINE WHETHER IMAGE DATA HAS BEEN RECORDED WITH WIDE DYNAMIC RANGE" in FIG. 6.

At S100, the wide dynamic range recording information 72 recorded in the header part of the image file 70 is read and it is determined whether or not the image data has been recorded with the wide dynamic range. If yes, the signal processing part 54 in FIG. 1 processes the data of the read image file in the wide dynamic range processing in FIG. 6. If the image data has been recorded in the normal recording method, the compressing device 48 in FIG. 1 performs conventional expansion and development processing.

At S102 of "DETERMINE RECORDED GRADATION METHOD," the recorded gradation state 76 of the tag information is read and the converting equations and the constants of the gradation conversion and the method of developing the image data according to the form are set.

At S104 of "DETERMINE RECORDED DYNAMIC RANGE," the dynamic range information 74 showing maximum reflectance information that has been actually set in the camera is read from the tag information and set as a constant at the gradation conversion.

At S106 of "DETERMINE COMPRESSION METHOD," the compression form 78 is read from the tag information and a constant for developing the image data is set according to the information showing whether the image data has been compressed and the from of the compression.

At S108 of "DETERMINE FILTER ARRANGEMENT," the filter arrangement form 80 is read from the tag information and the interline processing is set according to the filter arrangement of the CCD 14.

At S110 of "EXPANSION," the image data recorded in the image data area 82 according to the information of the compression form 78 is expanded.

At S112 of "INTERLINE PROCESSING," the interline processing is performed according to the filter arrangment of the CCD14 to separate the image data into the R, G and B image data.

At S114 of "EXPOSURE CORRECTION," the exposure of the separated image data is automatically corrected.

At S116 of "COLOR CORRECTION," the white balance of the exposure-corrected image data is corrected, and then the corrected image data is YC-converted and displayed on the displaying device 42 through the NTSC encoder 44 in FIG. 44.

At S118 of "EXPOSURE CORRECTION" and S120 of "COLOR CORRECTION," the user determines whether or not exposure correction and color correction are needed while looking at the image displayed on the displaying device 42, and the user determines correction amounts and performs them if they are needed. The correction amounts for the exposure correction and the color correction are determined according to the dynamic range information 74 of the tag information. The image data is corrected according to the determined correction amounts and the gradation-inverse-conversed image is displayed on the displaying device 42.

At the printing, the gamma correction suitable for the printing is performed at S122 of "GAMMA CORRECTION" as need arises.

At S124 of "INCREASE OR DECREASE NUMBER OF PIXELS," the number of the pixels is changed according to the definition of the print. At S126 of "SHARPNESS PROCESSING," sharpness processing is performed for edges of the image. After various corrections, the image data is transmitted to the printer 56 through the printer I/F 58 and the printing is performed at S128 of "PRINTING."

The image data recorded with the wide dynamic range is reproduced or printed in the above-described way, and thus the print whose density is appropriate can be obtained even if the AE was incorrect at the shooting.

It is easy for the user to shoot when the diaphragm 18 is relatively small and the shooting timing, which corresponds to the shutter speed, is high (exposure amount is small), and thus the exposure is low by about 1EV-2EV dark at the wide dynamic range imaging and it can be corrected at the printing. If the normal imaging mode is 200% imaging and the wide dynamic range imaging mode is 700% imaging and the exposure value in the normal imaging mode is 12, the exposure is under and the correction value is $\log_{10}(700/200)/\log_{10}2=1.8$EV and the exposure value is 13.8.

At the wide dynamic range imaging, the imaging in the normal imaging mode may be performed at the same time. In this case, the imaging is performed with the exposure value and the gain of the data of the normal imaging mode is increased by a gain controlling device (not shown) before the gamma correction part 34, and the image data with the exposure value of the normal imaging mode.

Figure 7:
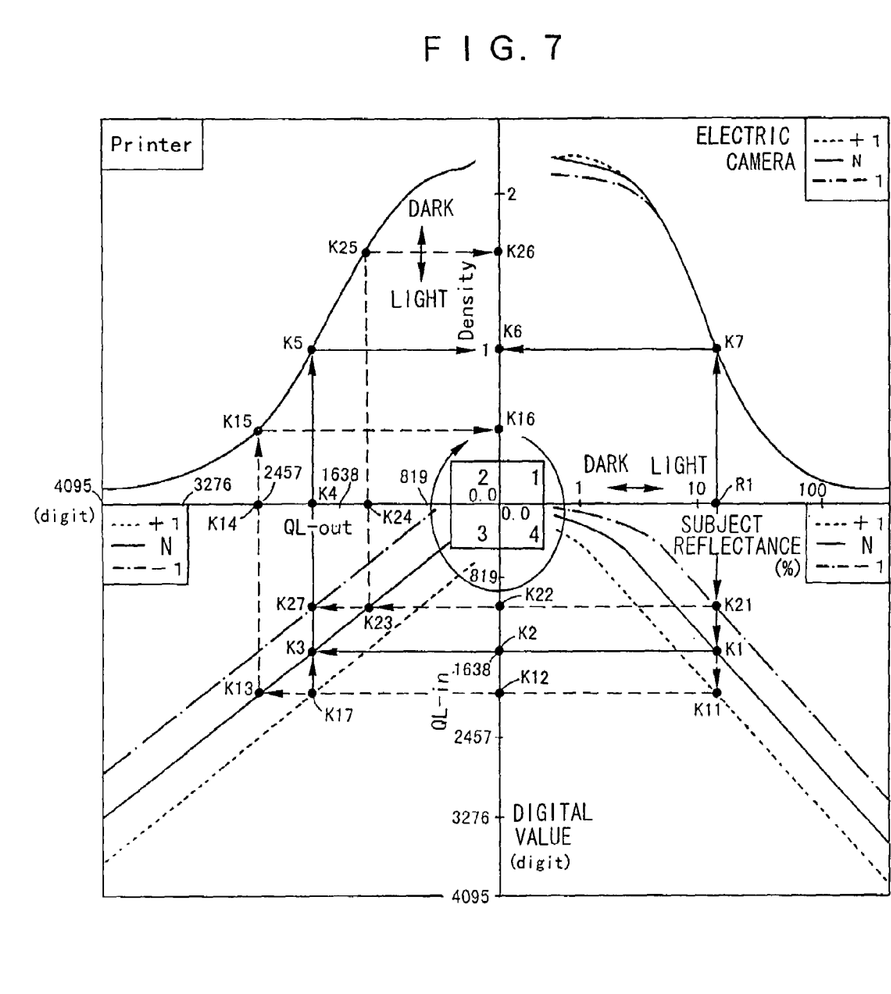
FIG. 7 is a graph diagram showing the relationship between the data at the shooting, gradation conversion, gradation inverse conversion, and the reproducing.

FIG. 7 is a graph diagram showing the relationship between the data at the shooting, gradation conversion, gradation inverse conversion, and the displaying or the printing.

The gradation conversion at the shooting and the printing will now be explained.

If the AE of the electronic camera 10 matches the desired exposure for the subject with subject reflectance R1 in the fourth quadrant, the image with the subject reflectance R1 is converted into the digital value to be recorded of a point K2 through a point K1 on a logarithmic gradation conversion curved line of the normal exposure, and the image is recorded in the recording device 46.

If the recorded image is to be reproduced, the recorded digital value of the point K2 is converted into the displaying or printing digital value of a point K4 through a point K3 on a logarithmic gradation inverse conversion curved line of the normal exposure in the third quadrant. Then, the displaying or printing digital value of the point K4 is converted into the displaying or printing density of a point K6 through a point K5 on a displaying or printing characteristic curved line in the second quadrant.

If the AE of the electronic camera 10 sets the exposure that is 1EV lower than the desired exposure, the diaphragm 18 is larger for 1EV and the subject with the subject reflectance R1 is recorded with the digital value to be recorded of a point K12. The digital value to be recorded of the point K12 is converted into the printing digital value of a point K14 through a point K13 on the logarithmic gradation inverse conversion curved line of the normal exposure. When the image data is reproduced, the printing digital value of the point K14 is converted into the displaying or printing digital value of a point K16 through a point K15 on the displaying or printing characteristic curved line in the second quadrant, and thus the density of the reproduced image is lower than that of the subject for 1EV and the image is too light.

The user chooses a logarithmic gradation inverse conversion curved line for positive exposure correction of 1EV in the third quadrant and converts the digital value to be recorded of the point K12 into the displaying or printing value of a point K4 through a point K17 on the logarithmic gradation inverse conversion curved line for positive exposure correction of 1EV to perform positive exposure correction of 1EV while looking at the reproduced image that is lighter than the desired image. The displaying or printing value of the point K4 is converted into the displaying or printing density of a point K5 on the displaying or printing characteristic curved line in the second quadrant.

If the AE of the electronic camera 10 sets the exposure that is 1EV higher than the desired exposure, the diaphragm 18 is smaller for 1EV and the subject with the subject reflectance R1 is recorded with the digital value to be recorded of a point K22. The digital value to be recorded of the point K22 is converted into the printing digital value of a point K24 through a point K23 on the logarithmic gradation inverse conversion curved line of the normal exposure. When the image data is reproduced, the printing digital value of the point K24 is converted into the displaying or printing digital value of a point K26 through a point K25 on the displaying or printing characteristic curved line in the second quadrant, and thus the density of the reproduced image is higher than that of the subject for 1EV and the image is too dark.

The user chooses a logarithmic gradation inverse conversion curved line for negative exposure correction of 1EV in the third quadrant and converts the digital value to be recorded of the point K22 into the displaying or printing value of the point K4 through a point K27 on the logarithmic gradation inverse conversion curved line for negative exposure correction of 1EV to perform negative exposure correction of 1EV while looking at the reproduced image that is darker than the desired image. The displaying or printing value of the point K4 is converted into the displaying or printing density of the point K5 on the displaying or printing characteristic curved line in the second quadrant.

In the above explanation, the user manually corrects the density while looking at the reproduced image, but the density of the image may be automatically determined and corrected.

A conversion curved line in the first quadrant in FIG. 7 shows the processing in the second, third and fourth quadrants. The subject with the subject reflectance R1 in the first quadrant is converted into the print density of the point K6 through a point K7 on the curved line, and the image is recorded in the recording device 46 with the print density of the point K6.

Figure 8:
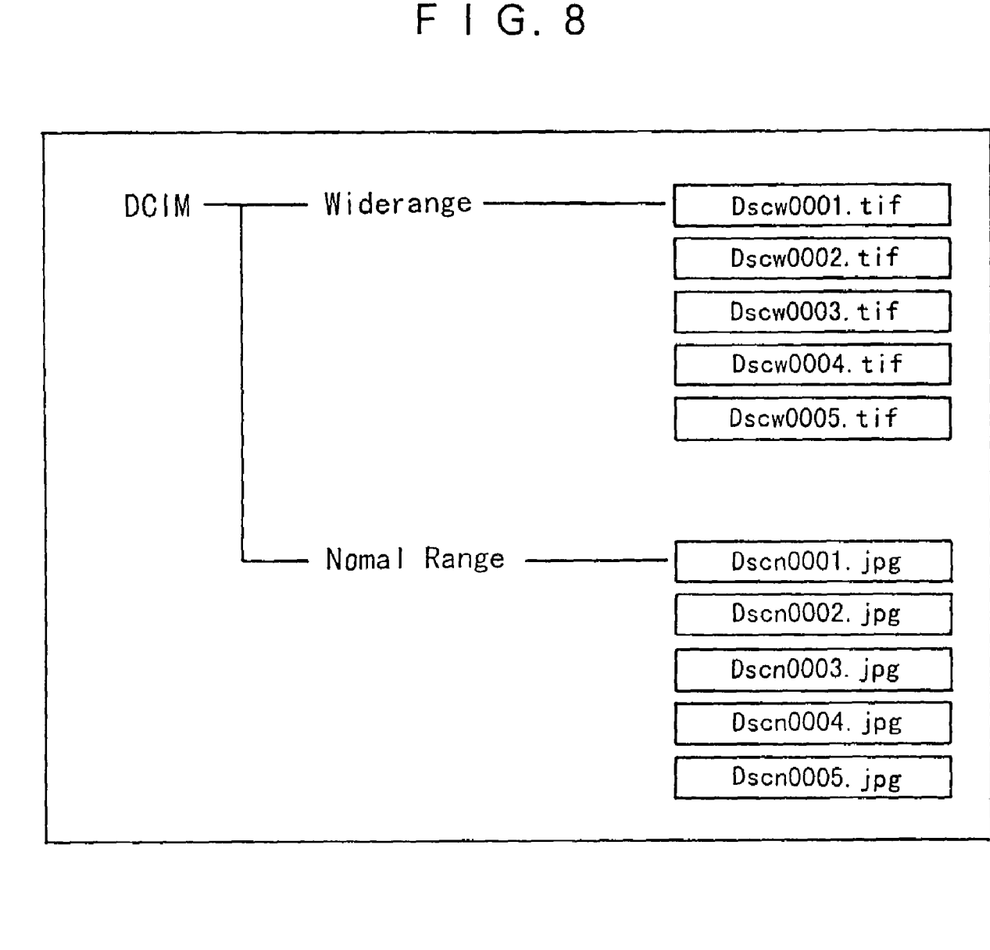
FIG. 8 is a diagram showing a directory structure when the image file is recorded in a recording device.

FIG. 8 shows the directory structure when the image file is recorded in the recording device 46.

As shown in FIG. 8, a directory named "DCIM" is composed of a directory "Widerange" storing image files recorded with the wide dynamic range and a directory "NomalRange" storing image files recorded in the normal mode.

The directory "Widerange" stores image files "Dscw0001.tif," "Dscw0002.tif," . . . recorded with the wide dynamic range. "Dscw" represents that the image files have been recorded with the wide dynamic range. "0001" represents the shooting order or the type, and the extension "tif" represents the structure of the compressed file.

The directory "NomalRange" stores image files "Dscn0001.jpg," "Dscn0002.jpg," . . . recorded in the normal imaging mode. "Dscn" represents that the image files have been recorded in the normal imaging mode. "0001" represents the shooting order or the type, and the extension "jpg" represents the structure of the compressed file.

The image files recorded with the wide dynamic range and the image files recorded in the normal imaging mode are classified with the directories and the file names as described above, and thus the image files can be easily arranged, classified and searched after shooting.

As explained above, the electronic camera according to the present invention has the imaging device that images the subject with the dynamic range wider than that at the displaying or the printing to acquire the image data and the recording device that converts the image data acquired by the imaging device with a predetermined function and records the converted image data and the information on the function. Therefore, the printed image with the automatically or manually corrected density can be obtained at the displaying or the printing.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera, comprising:
an imaging device configured to image a subject in a luminance mode to generate raw image data,
wherein the luminance mode is one of at least a first luminance mode and a second luminance mode,
wherein in the first luminance mode, the imaging device images the subject in a first luminance range, wherein in the second luminance mode, the imaging device images the subject in a second luminance range different than the first luminance range; and wherein in at least one of the first luminance mode and the second luminance modes the imaging device images the subject with an exposure value that is lower than a normal exposure value for a desired reproducing;

a processing device configured to generate converted image data by processing the raw image data based on the luminance mode of the raw image data; and a recording device configured to record the converted image data in a storage area and configured to record the luminance mode of the raw image data in the storage area separately from the converted image data.

2. The electronic camera as set forth in claim 1, wherein the recording device records the converted image data and the luminance mode of the raw image data in a same file as the converted image data.

3. The electronic camera as set forth in claim 1, wherein the first luminance range is wider than a luminance range of an image reproducing device and the second luminance range is substantially the same as the luminance range of the reproducing device.

4. The electronic camera as set forth in claim 1, wherein the processing device comprises:

a gradation conversion device configured to convert the raw image data to the converted image data based on a gradation conversion function, wherein the recording device is configured to record the gradation recording function in the storage area in a same file as the converted image data.

5. The electronic camera as set forth in claim 4, wherein the first luminance range is wider than the second luminance range and gradation conversion device configured to convert the raw image data to the converted image data based on the gradation conversion function when the electronic camera is in the first luminance mode.

6. The electronic camera as set forth in claim 4, wherein the gradation conversion function is a relationship between digital values of the converted image data and reflectance values of the imaged subject.

7. The electronic camera as set forth in claim 6, wherein the relationship between the digital values of the converted image data and the reflectance values of the imaged subject includes a linear relationship, a logarithmic relationship, or both.

8. The electronic camera as set forth in claim 7, wherein the recording device is configured to record a first-order coefficient of the linear relationship in the same file as the converted image data, to record a base, a first-order coefficient, and a zero-order coefficient of the logarithmic relationship in the same file as the converted image data, or both.

9. The electronic camera as set forth in claim 4, wherein the imaging device is configured to image the subject with one of a plurality of exposure values, wherein the gradation conversion device is configured to use the gradation conversion function from a plurality of gradation conversion functions based on the particular exposure value used by the imaging device, and wherein the recording device is configured to record the exposure value used by the imaging device in the same file as the converted image data.

* * * * *